US012665737B2

(12) United States Patent
Chen et al.

(10) Patent No.: US 12,665,737 B2
(45) Date of Patent: Jun. 23, 2026

(54) APPARATUS AND METHOD FOR TRANSITION-SENSING BASED CLOCK RECOVERY IN BURST MODE TIME-DIVISION MULTIPLE-ACCESS COMMUNICATION SYSTEM

(71) Applicant: Transcend Semiconductor Co. Ltd., Shenzhen (CN)

(72) Inventors: Benjamin F. Chen, Dallas, TX (US); Yanfei Jiang, Frisco, TX (US)

(73) Assignee: Transcend Semiconductor Co. Ltd., Shenzhen (CN)

( * ) Notice: Subject to any disclaimer, the term of this patent is extended or adjusted under 35 U.S.C. 154(b) by 71 days.

(21) Appl. No.: 18/926,306

(22) Filed: Oct. 25, 2024

(65) Prior Publication Data

US 2026/0121824 A1 Apr. 30, 2026

(51) Int. Cl.
*H04L 7/00* (2006.01)
*H04B 10/40* (2013.01)
*H04L 7/033* (2006.01)

(52) U.S. Cl.
CPC ............. *H04L 7/033* (2013.01); *H04B 10/40* (2013.01)

(58) Field of Classification Search
CPC ............. G06F 9/30065; G06F 9/30134; H04L 7/0337; H04L 7/0334; H04L 7/0008; H04B 10/08

USPC ................................................... 375/355, 376
See application file for complete search history.

(56) References Cited

U.S. PATENT DOCUMENTS

| | | | |
|---|---|---|---|
| 10,142,066 B1* | 11/2018 | Draving ............ | H04L 25/03146 |
| 2003/0016412 A1* | 1/2003 | Eilenberger .............. | H04L 1/20 398/5 |
| 2017/0272231 A1* | 9/2017 | Chen ........................ | H04L 25/14 |
| 2025/0233783 A1* | 7/2025 | Park ........................ | H04L 25/49 |

* cited by examiner

*Primary Examiner* — Khai Tran
(74) *Attorney, Agent, or Firm* — AP3 Law Firm PLLC

(57) ABSTRACT

A burst mode communication system may include one or more lanes. Each lane is configured to receive burst data streams sent according to a clock signal and recover the clock signal. A lane may receive a first burst data stream and a second burst data stream in two adjacent clock cycles of the clock signal, and convert the first burst data stream into a first pulse signal and convert the second burst data stream into a second pulse signal. The lane may recover the clock signal by detecting a time interval between rising edges of the first pulse signal and the second pulse signal. The burst data streams are different signals and sent to the burst mode communication system in the time-division multiple-access (TDMA) scheme. A clock recovery circuit is also provided in the lane for recovering the clock signal.

20 Claims, 9 Drawing Sheets

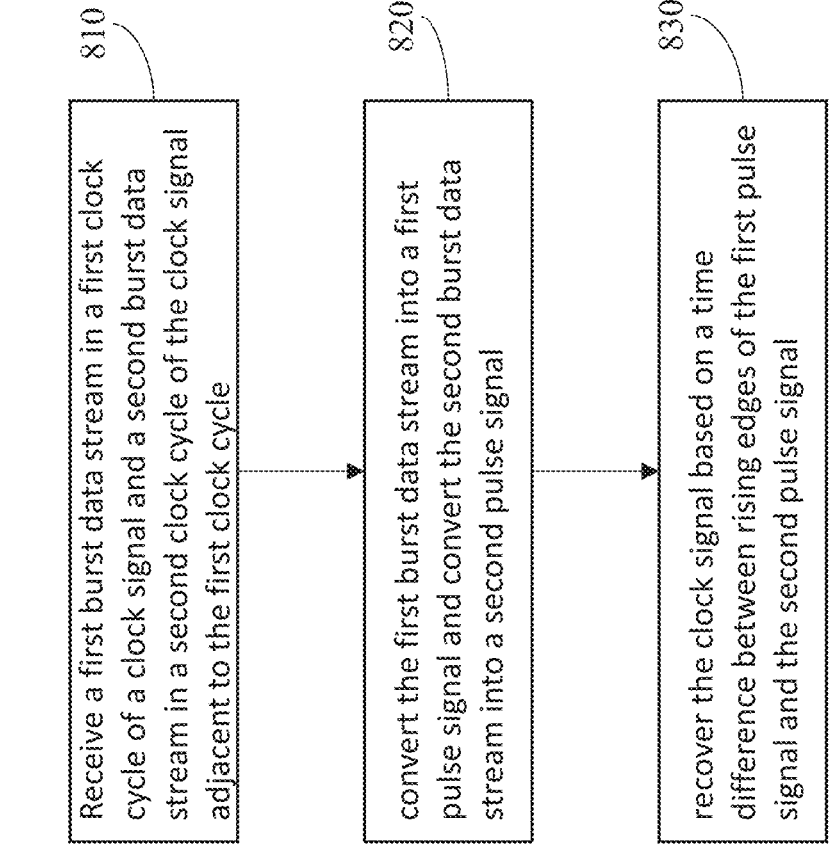

800

Receive a first burst data stream in a first clock cycle of a clock signal and a second burst data stream in a second clock cycle of the clock signal adjacent to the first clock cycle

810 convert the first burst data stream into a first pulse signal and convert the second burst data stream into a second pulse signal

820 recover the clock signal based on a time difference between rising edges of the first pulse signal and the second pulse signal

APPARATUS AND METHOD FOR TRANSITION-SENSING BASED CLOCK RECOVERY IN BURST MODE TIME-DIVISION MULTIPLE-ACCESS COMMUNICATION SYSTEM

TECHNICAL FIELD

The present disclosure relates generally to the field of burst mode communications, and in particular embodiments, to techniques and mechanisms for transition-sensing based clock recovery in a burst mode time-division multiple-access communication system.

BACKGROUND

In burst-mode communication systems, multiple network units share a same bus or line to exchange information or data. As an example, a central unit or master node may broadcast packets to sub-terminals or slave nodes continuously, and each sub-terminal or slave mode may choose to receive one of the packets sent to it and/or send the packets to the central unit/master node or other slave nodes. In the burst-mode, the central terminal/master node and the sub-terminals/slave nodes may send and receive burst packets/data streams over the bus or line. Each burst packet is sent within a short period of a clock cycle and in a high frequency. The upstream and downstream transmissions over the bus/line may be managed using a time-division multiple-access (TDMA) scheme in order to avoid interference among packets.

Examples of the burst-mode communication system include, but are not limited to, an automotive bus communication system (such as the media oriented systems transport (MOST) or the automotive audio bus (A2B) system), or a gigabit Ethernet passive optical network (GE-PON) system.

The MOST and A2B systems are well-known TDMA based communication systems, and all nodes in a system are synchronized to a data sample rate. The MOST system provides a low overhead, low cost point-to-point network for multimedia communications, and may be implemented in a ring, star or daisy-chain topology over plastic optical fibers or unshielded twisted pair (UTP) cables. The A2B system may be implemented in a daisy-chain topology over UTP cables.

In a PON system, a single fiber branches off at a splitter and is shared by multiple subscribers, and an optical line terminal (OLT) in a central office communicates with multiple optical network units (ONUs) located at the subscribers' premises over the split fibers through the splitter. The OLT may broadcast burst packets to the ONUs continuously. Each ONU may receive one or more packets sent to it, and send one or more packets to the OLT. The upstream transmission (from ONUs to the OLT) is managed using a TDMA scheme in order to avoid interference among packets. The OLT may have a burst optical receiver including a photo-diode, a transimpedance amplifier (TIA), a limiting amplifier (LA), and a clock and data recovery circuit, as an example. The OLT needs to receive signals with different powers and phases, and recover clock and data within a short period.

In some of the burst-mode communication system, data are transmitted without any specific clock information. A receiving end (or receiver) needs to recover the clock of the incoming data in order to correctly sample and receive the incoming data. The recovered clock may also be used to re-time the incoming data. This process is called clock and data recovery (CDR).

Conventional methods may recover the clock by phase-aligning to incoming data transitions based on a reference frequency and using a phase-locked loop (PLL) and extracting a clock signal from an incoming signal/data. An example for burst-mode CDR is the multiple-phase-clock method, where multiple clock signals having the same frequency and different phases are generated based on a reference frequency and used to determine the right clock of the incoming burst packets. Another example for burst-mode CDR is the gated voltage controlled oscillator (GVCO) method, where a GVCO performs phase realignment according to a gating signal resulted from detection of transitions of incoming data, to generate a clock signal.

However, the conventional solutions generally take a large chip area and require high power consumption. It is desirable to develop clock recovery mechanisms that provide improved performance with reduced chip area occupancy.

SUMMARY

Technical advantages are generally achieved, by embodiments of this disclosure which describe a method and an apparatus for transition-sensing based clock recovery in a burst mode time-division multiple-access communication system.

In accordance with one aspect of the present disclosure, a lane of a burst mode communication system is provided that includes: a transceiver configured to receive burst data streams sent according to a clock signal having a clock frequency; and a clock recovery circuit in communication with the transceiver. The clock recovery circuit is configured to: receive, from the transceiver, a first burst data stream in a first clock cycle of the clock signal and a second burst data stream in a second clock cycle of the clock signal, the second clock cycle being adjacent to the first clock cycle; convert the first burst data stream into a first pulse signal and convert the second burst data stream into a second pulse signal; and recover the clock signal based on a time interval between rising edges of the first pulse signal and the second pulse signal.

In accordance with another aspect of the present disclosure, a burst mode communication system comprising at least one lane is provided. The at least one lane includes: a transceiver configured to receive burst data streams sent to the burst mode communication system according to a clock signal having a clock frequency; and a clock recovery circuit in communication with the transceiver. The clock recovery circuit is configured to: receive, from the transceiver, a first burst data stream in a first clock cycle of the clock signal and a second burst data stream in a second clock cycle of the clock signal, the second clock cycle being adjacent to the first clock cycle; convert the first burst data stream into a first pulse signal and convert the second burst data stream into a second pulse signal; and recover the clock signal based on a time difference between rising edges of the first pulse signal and the second pulse signal.

In accordance with another aspect of the present disclosure, a method is provided that includes: receiving, at a lane of a burst mode communication system, a first burst data stream and a second burst data stream that are sent according to a clock signal having a clock frequency, wherein the first burst data stream and the second burst data stream are sent in two adjacent clock cycles of the clock signal; converting, at the lane, the first burst data stream into a first pulse signal and converting, at the lane, the second burst data stream into a second pulse signal; and recovering, at the lane, the clock signal based on a time interval between rising edges of the first pulse signal and the second pulse signal.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 8 is a flowchart of an example method for clock recovery according to embodiments of the present disclosure.

Corresponding numerals and symbols in the different figures generally refer to corresponding parts unless otherwise indicated. The figures are drawn to clearly illustrate the relevant aspects of the embodiments and are not necessarily drawn to scale.

DESCRIPTION OF ILLUSTRATIVE EMBODIMENTS

Figure 1:
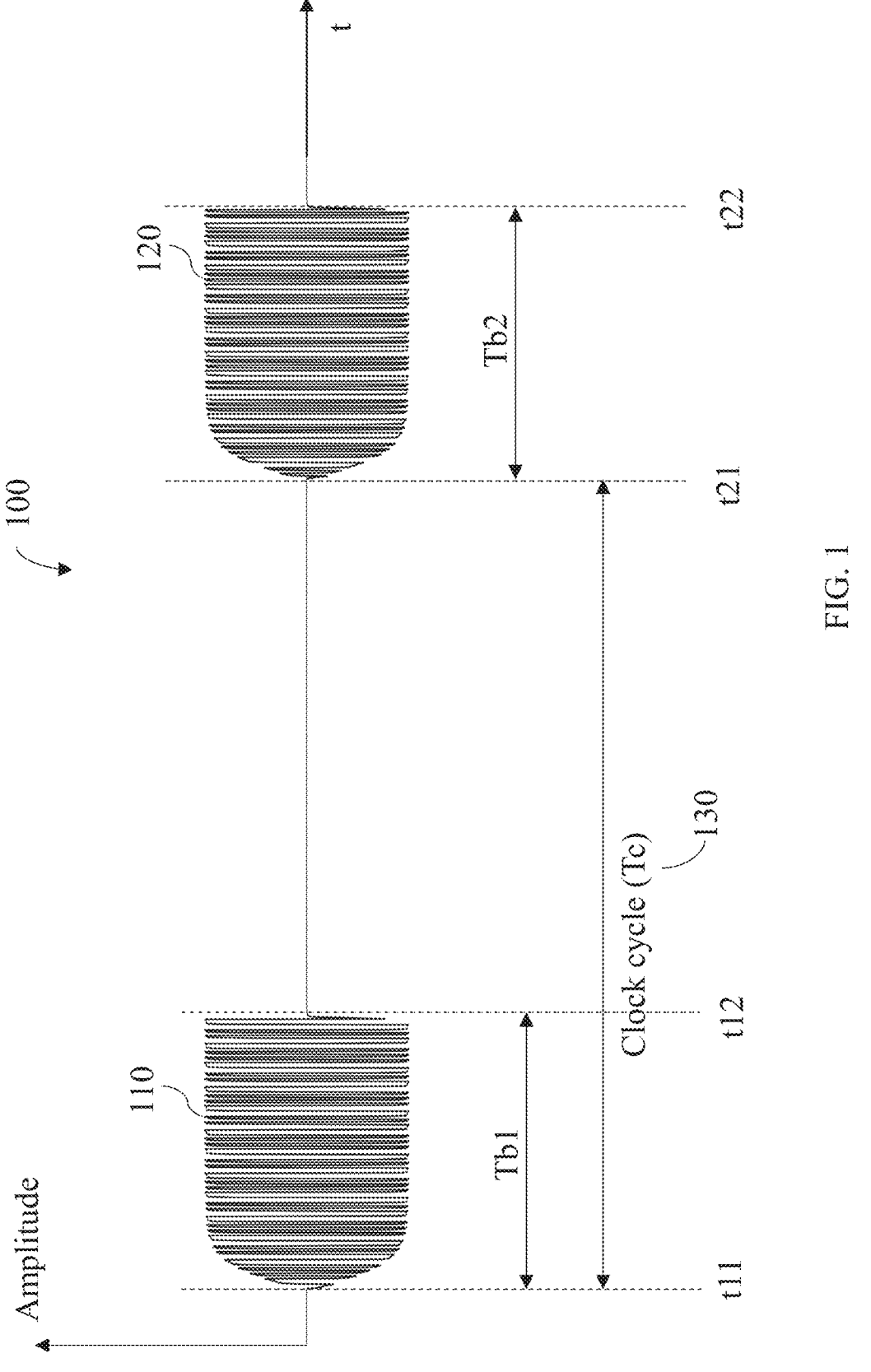
FIG. 1 is a diagram of example burst signals according to embodiments of the present disclosure.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Further, one or more features from one or more of the following described embodiments may be combined to create alternative embodiments not explicitly described, and features suitable for such combinations are understood to be within the scope of this disclosure. It is therefore intended that the appended claims encompass any such modifications or embodiments.

It should be noted that in this disclosure, relational terms such as "first", "second", "third", and so on, are only used to distinguish one entity or operation from another entity or operation, and do not necessarily require or imply that any actual relationship or order exists between these entities or operations. Furthermore, the term "include", "comprise" or any other variations thereof intended to cover a non-exclusive inclusion, such that a process, method, article, or a device including a set of elements not only includes those elements, but also includes other elements not expressly listed, or also includes elements inherent in such a process, method, article, or device. Without further limitations, an element defined by the phrase "include a . . . " does not exclude the presence of additional elements in the process, method, article or device including the element.

The present disclosure will be described with respect to embodiments in a specific context, namely transition-sensing based clock recovery in a burst mode time-division multiple-access communication system. The disclosure may also be applied, however, to a variety of communication systems, such as a burst mode two-wire bus communication system, or a burst mode serial communication system. Hereinafter, various embodiments will be explained in detail with reference to the accompanying drawings.

Embodiments of the present disclosure provide a system, method and apparatus for clock recovery of signals/data that are transmitted in a burst mode and using time-division multiple-access. The embodiments provide instantaneous phase locking with reduced overhead time and improved transmission efficiency. The provided solutions reduce the complexity as seen in the conventional mechanisms, lower the power consumption, and utilize a compact circuitry to achieve clock recovery.

In the burst mode, signals/data are transmitted in burst in clock cycles (or burst cycles). Signals/data are transmitted at a high data rate over a short period of time during each clock cycle. A signal transmitted in the burst mode may be referred to as a burst signal. Burst signals may be burst packets or burst data streams having a high data rate.

FIG. 1 is a diagram of an example 100 of burst signals according to embodiments of the present disclosure. The horizontal axis is time and the vertical axis represents amplitudes of the burst signals. The burst signals are transmitted according to a clock signal having a clock frequency. The clock signal has clock cycles, which have a period or interval Tc in the time domain. The burst signals are transmitted in the clock cycles. FIG. 1 shows a first burst signal 110 transmitted in a first clock cycle 130, and a second burst signal 120 transmitted in a next clock cycle (not shown) subsequently. The burst signal in each clock cycle may only occupy a portion of the clock cycle, and the signal energy in the rest of the clock cycle may be zero or within an energy range deemed as noises. The burst signals transmitted in different clock cycles may have different lengths (or widths) in the time domain. For example, the first burst signal 110 may have a length Tb1 in the first clock cycle, and the second burst signal 120 may have a length Tb2 in the second clock cycle. Tb1 and Tb2 may be much smaller than the length Tc of the clock cycles. The lengths of Tb1, Tb2 and Tc may vary depending on the specific applications. The burst signal in each clock cycle is transmitted at a frequency higher than the clock signal. The frequencies of the burst signals and the clock signal may vary depending on the specific applications.

As shown in the example of FIG. 1, the burst signal may start in the beginning of each clock cycle. The first burst signal 110 may start at time t11 and ends at time t12, and the second burst signal 120 may start at time t21 and ends at time t22. The interval between t11 and t12 is the period of the clock cycles of the clock signal. The first clock cycle starts from t11 and the second clock cycle starts from t21. In other examples, each burst signal transmission may also be started after a corresponding clock cycle is started. In the following, the case where each burst signal starts at the beginning of each clock cycle will be used as an example for illustration of the embodiments. The embodiments may be similarly applied to other cases.

Figure 2:
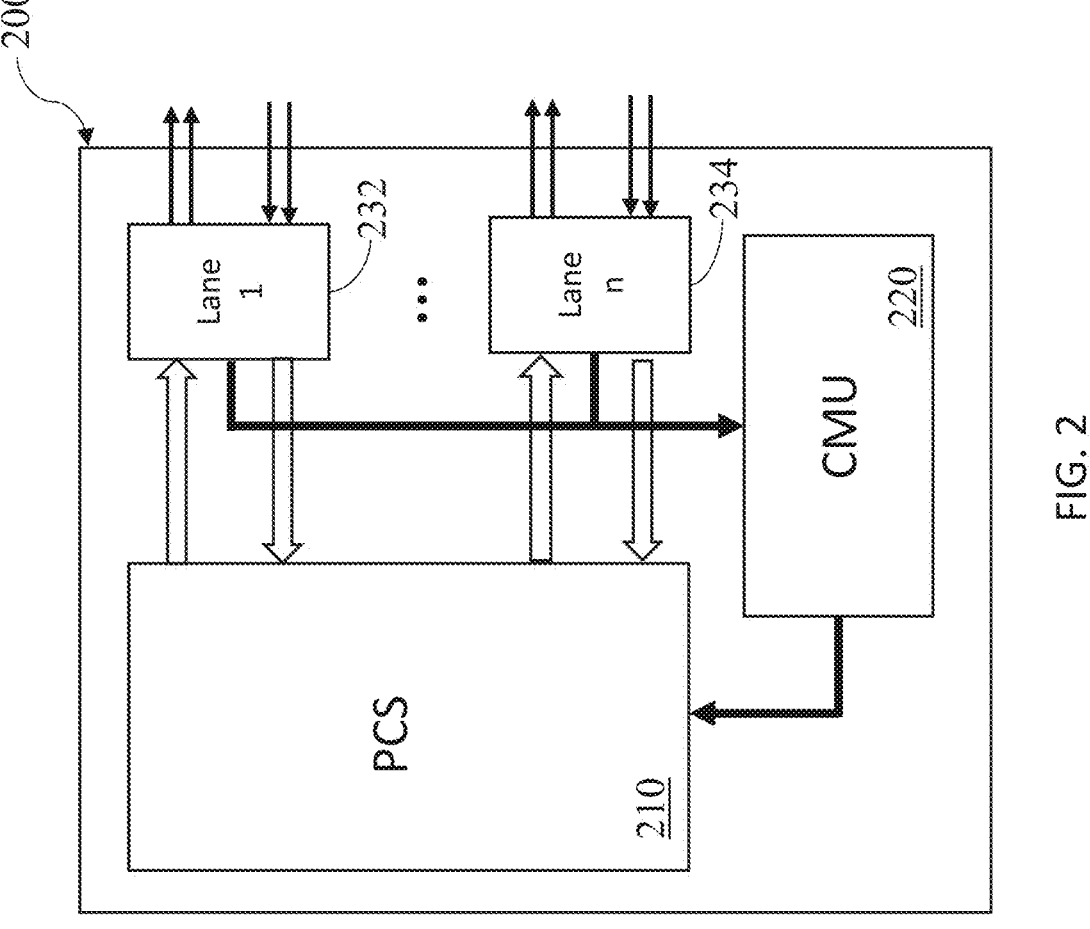
FIG. 2 is a block diagram of an example burst mode communication system according to embodiments of the present disclosure.

FIG. 2 is a block diagram of an example burst mode communication system 200 according to embodiments of the present disclosure. The system 200 may be applied in a media oriented systems transport (MOST) system, an automotive audio bus (A2B) system, a gigabit Ethernet passive optical network (GE-PON) system, or other applicable communication systems, such as a two-wire bus communication system, or a serial communication system. The system 200 may be used to implement a central unit, a master node, sub-terminal, a slave node, an optical line terminal (OLT), and/or an optical network unit. As shown, the system 200 includes a physical coding sublayer (PCS) 210, a clock multiplier unit (CMU) 220, and lane(s), e.g., lanes 232 and 234.

The PCS 210 is connected to the CMU 220 and the lane(s). The PCS 210 is configured to communicate burst signals with the lane(s), translate data (received from or to be sent to a high speed interface) to the digital domain, perform data encoding/decoding and symbol alignments, perform data scrambling/descrambling, and so on. The structure and function of a PCS are well known, and thus are not detailed herein. Any PCS existing or developed in future that can achieve the functions of the PCS 210 in the system 200 may be used to implement the PCS 210.

The CMU 220 is also connected to the lane(s). The CMU 220 is configured to manages peripherals and clock generation of the system 200. Specifically, the CMU 220 may be configured to determine and generate a data frequency of the burst signals based on a clock signal of the burst signals that is recovered, and send information of the data frequency to the PCS 210. The PCS 210 may perform, according the data frequency, data recovery of burst signals received from the lanes. For example, the CMU 220 may obtain a recovered clock signal from a lane, e.g., the lane 232, multiply the clock frequency of the clock signal by a number (e.g., a clock multiplier, which is a known number) to obtain a data frequency of a burst signal from the lane. As used herein, the frequency of a clock signal is referred to as a clock frequency, and the frequency of a burst signal is referred to as a data frequency. The CMU 220 may be implemented using a phase-locked loop (PLL) frequency multiplier circuitry. For example, the CMU 220 may include an internal phase lock loop (PLL), and a reference clock input buffer. Any CMU existing or developed in future that can achieve the functions of the CMU 220 of the system 200 may be used to implement the CMU 220.

The system 200 may include one or more lanes, such as lane 1 (232), lane 2 (not shown), . . . , and lane n (234). The lanes may be configured as transceivers receiving burst signals from outside of the system 200 and transmitting burst signals to outside of the system 200 over buses, and configured to perform clock recovery of received burst signals. The system 200 may communicate with external systems or devices over the buses in the half duplex mode. The burst signals received and transmitted by each lane over a bus may be differential signals, which are communicated using the time-division multiple-access (TDMA) scheme.

Figure 3:
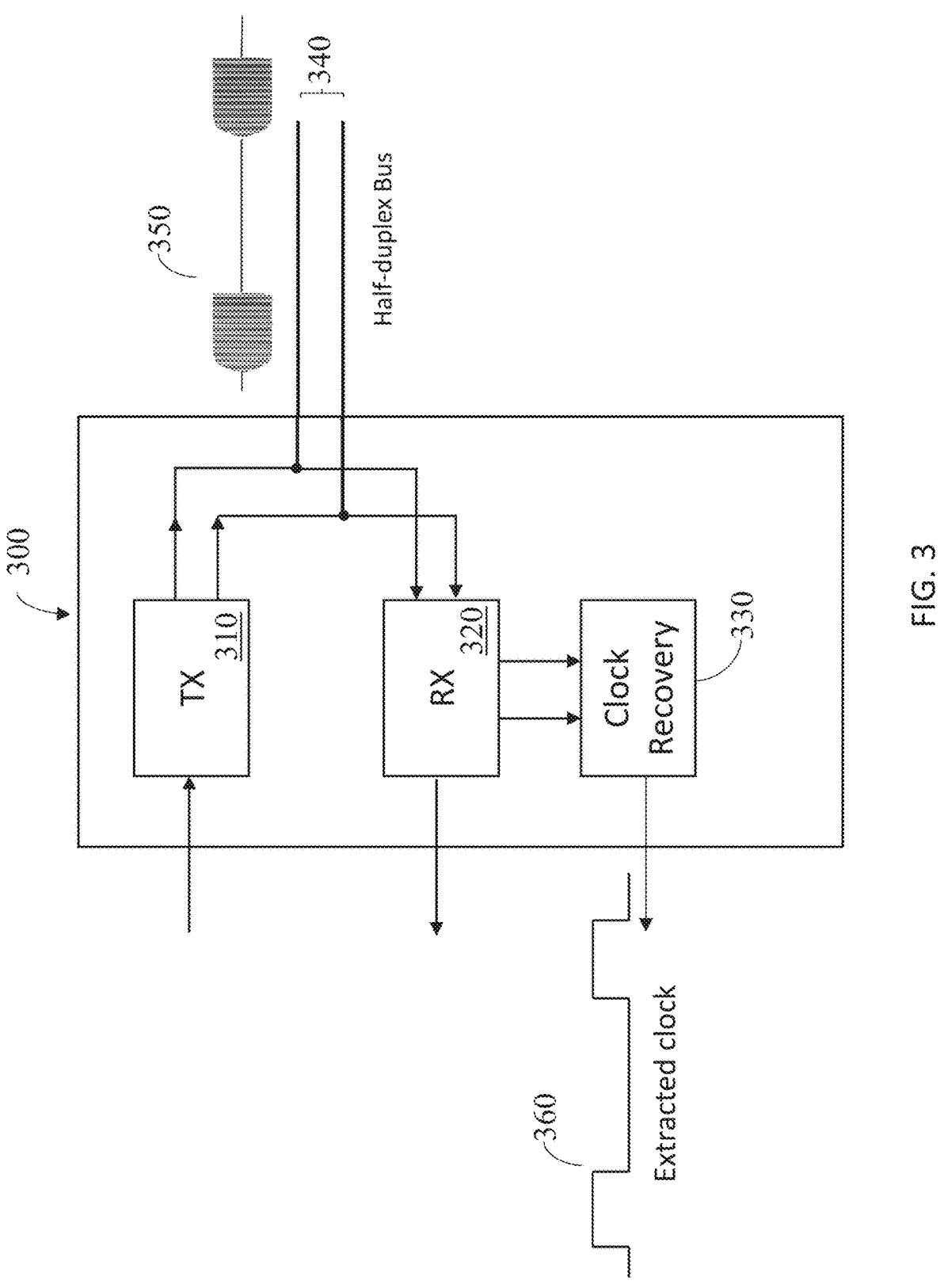
FIG. 3 is a block diagram of a lane in a burst mode communication system according to embodiments of the present disclosure.

As an example, FIG. 3 is a block diagram of a lane 300 according to embodiments of the present disclosure. The lane 300 may be used to implement the lanes in the system 200. As shown, the lane 300 includes a transmitter 310, a receiver 320 and a clock recovery circuit/block 330. The transmitter 310 and the receiver 320 may be combined and implemented as a transceiver.

The transmitter 310 is configured to receive, e.g., from the PCS 210, burst signals to be transmitted by the communication system 200 to an external systems or device (referred to as an external receiver), and transmit the burst signals over a bus 340 to the external receiver, according to a clock signal.

The receiver 320 is configured to receive burst signals from an external system or device (referred to as an external transmitter), e.g., another system 200, and send the received burst signals to the PCS 210 and the clock recovery block/circuit 330. The clock recovery block 330 is configured to perform clock recovery on the received burst signals to recover a clock signal of the received burst signals, and send the recovered clock signal to the CMU 220. The PCS 210 performs data recovery of the burst signals according to a data frequency generated by the CMU 220 based on the recovered clock signal. FIG. 3 shows burst signals 350 received by the receiver 320, which forwards the burst signals 350 to the clock recovery block 330. The clock recovery block 300 performs clock recovery and outputs a recovered clock signal 360.

In some embodiments, the clock recovery block 330 may recover the clock signal of the burst signals by detecting the starting time of the burst signals in two consecutive (or adjacent) clock cycles, and determining the clock frequency based on the detected starting time. Referring back to FIG. 1, as an example, the clock recovery block 330 may detect the starting time t11 of the burst signal 110 and the starting time t21 of the burst signal 120, to determine the period Tc of the first clock cycle 130, and the clock frequency obtained is thus fc=1/Tc. Based on the clock frequency, the CMU 220 may generate the data frequency fd of the first burst signal 110 in the first clock cycle 130. The PCS 210 may then perform data recovery of the burst signal 110 according to the data frequency fd. In one embodiment, the system 200 may use the data frequency fd to recover other burst signals in subsequent clock cycles. In another embodiment, the clock recovery block 330 may perform clock recovery continuously on incoming burst signals. In an example, as burst signals are received by a lane, the clock recovery block 330 of the lane may perform clock recovery based on detection of burst signals in each two consecutive clock cycles (referred to as a first clock cycle and a second clock cycle) to recover a clock signal, which is used for performing data recovery of a burst signal in the first clock cycle.

In some embodiments, information of the clock signal embedded in the burst signals may be extracted to recover the clock signal. In an embodiment, the clock recovery block 330 may convert the burst signal in each clock cycle into a pulse signal, and determine the period Tc of the clock cycle based on the time difference between the rising edges of two consecutive pulse signals. The clock signal is recovered by generating two consecutive pulse signals. A burst signal (analog) in the time domain is generally a signal with amplitudes oscillating between a negative value and a positive value (i.e., zero-crossing) at a high speed within a short period of time of a clock cycle. For the rest of time in the clock cycle, the signal energy is zero or very small (e.g., noises). Converting such a burst signal into a pulse signal enables to keep and extract the time information of the burst signal, e.g., the starting time of the burst signal. The pulse signal is a single pulse including an ascending edge and a descending edge corresponding to the starting time and ending time of the burst signal, respectively. The pulse has a width that is approximately the same as the length of the burst signal, e.g., the length Tb1 in FIG. 1. In some embodiments, converting a burst signal into a pulse signal may include removing the amplitude oscillation. In some embodiments, converting a burst signal into a pulse signal may include removing the rising edges and falling edges of the burst signal between the starting time and ending time of the burst signal.

A burst signal in each clock cycle may be a differential signal Sb including a positive component/signal Sbp and a negative component/signal Sbn. The differential signal Sb may be referred to as a differential signal pair Sb including Sbp and Sbn. The positive component/signal Sbp and the negative component/signal Sbn have the same signal amplitude but opposite polarity (180 degree out of phase with each other), and are transmitted over respective wires in the bus. In some embodiments, the clock recovery block 330 may be configured to convert the differential signals received in clock cycles into pulse signals.

Figure 4:
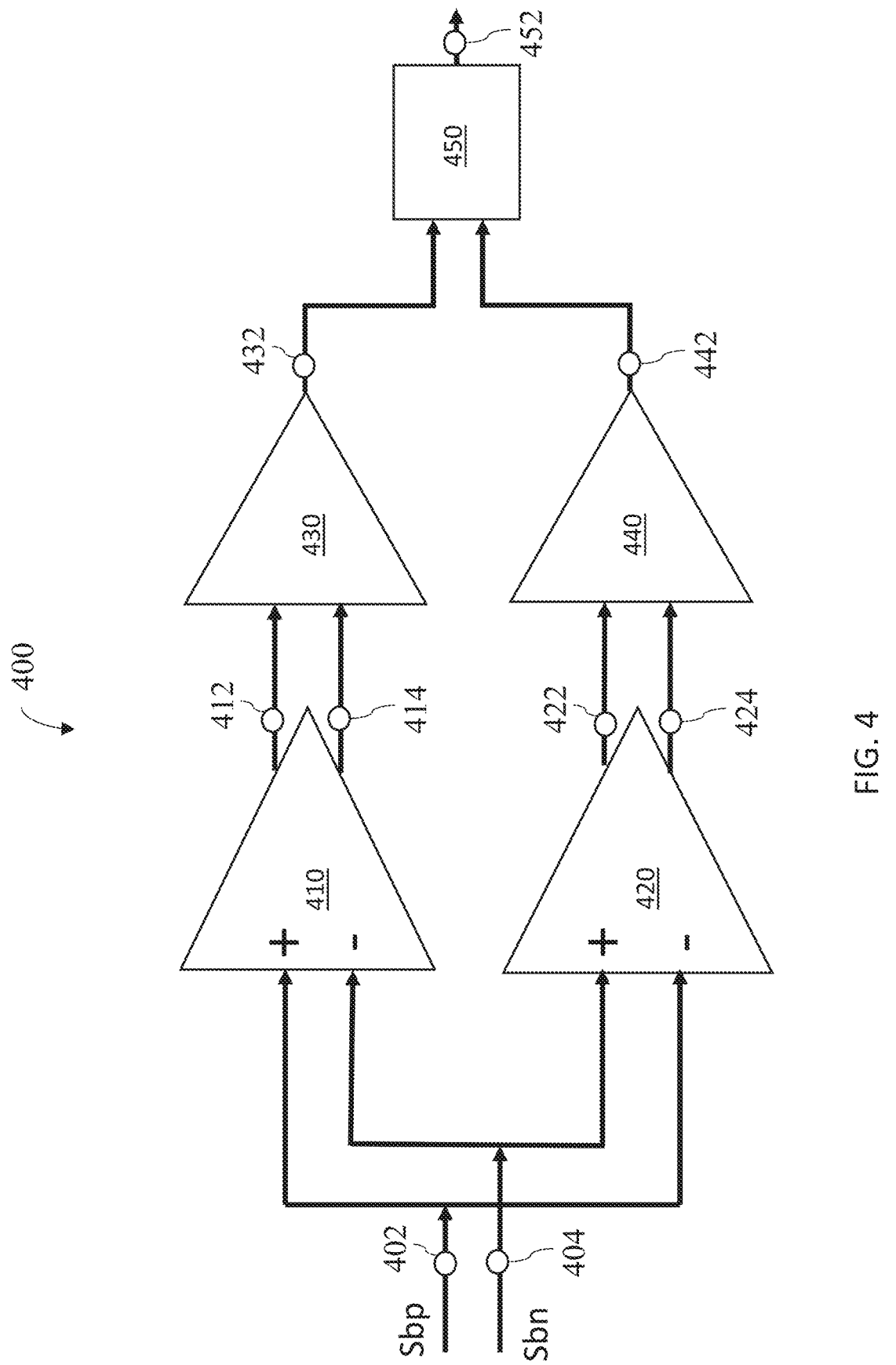
FIG. 4 is a block diagram of a clock recovery block according to embodiments of the present disclosure.

FIG. 4 is a block diagram of a clock recovery circuit 400 according to embodiments of the present disclosure. The clock recovery circuit 400 may be used to implement the clock recovery block 330 in FIG. 3. The clock recovery circuit 400 includes amplifier circuits 410 and 420, differential to single-ended conversion circuits 430 and 440, and a filter circuit 450.

The clock recovery circuit 400 receives an input differential signal (e.g., a different voltage/current signal) including a positive component Sbp and a negative component Sbn at input terminals 402 and 404, respectively. The clock recovery circuit 400 may receive the input differential signal from the receiver 320. The amplifier circuit 410 receives Sbp and Sbn at its positive input terminal and negative input terminal respectively, and generates and outputs a first differential signal pair at its output terminals 412 and 414. The amplifier circuit 410 has the function of a comparison circuit, and outputs a high-level voltage signal or a low-level voltage signal according to the voltages at the terminals 412 and 414 with respect to a threshold. The first differential signal pair includes time information of the input differential signal and includes portions of the input differential signal having amplitudes greater than the threshold. The first differential signal pair is fed into the differential to single-ended conversion circuit 430, which generates and outputs a first single-ended signal at its output terminal 432.

The amplifier circuit 420 receives Sbp and Sbn at its negative input terminal and positive input terminal respectively, and generates and outputs a second differential signal pair at its output terminals 422 and 424. The amplifier circuit 420 has the function of a comparison circuit, and outputs a high-level voltage signal or a low-level voltage signal according to the voltages at the terminals 422 and 424 with respect to a threshold. The second differential signal pair includes time information of the input differential signal and includes portions of the input differential signal having amplitudes greater than the threshold. The second differential signal pair is fed into the differential to single-ended conversion circuit 440, which generates and outputs a second single-ended signal at its output terminal 442. The thresholds used for the amplifier circuits 410 and 420 may be the same or different from each other.

The first single-ended signal and the second single-ended signal are fed into the filter 450 and processed by the filter 450, which generates and outputs a pulse signal of the input differential signal at its output terminal 452. The pulse signal containing information of the clock frequency may then be sent to the CMU 220 as described with respect to FIG. 2. As the clock recovery circuit 400 continues to receive differential signals in clock cycles, it continuously generates pulse signals corresponding to the clock cycles. Generally, the clock recovery circuit 400 is designed to smooth out the amplitude oscillation of the input differential signal while keeping the information of the starting time and length of the differential signal in each clock cycle.

Figure 5:
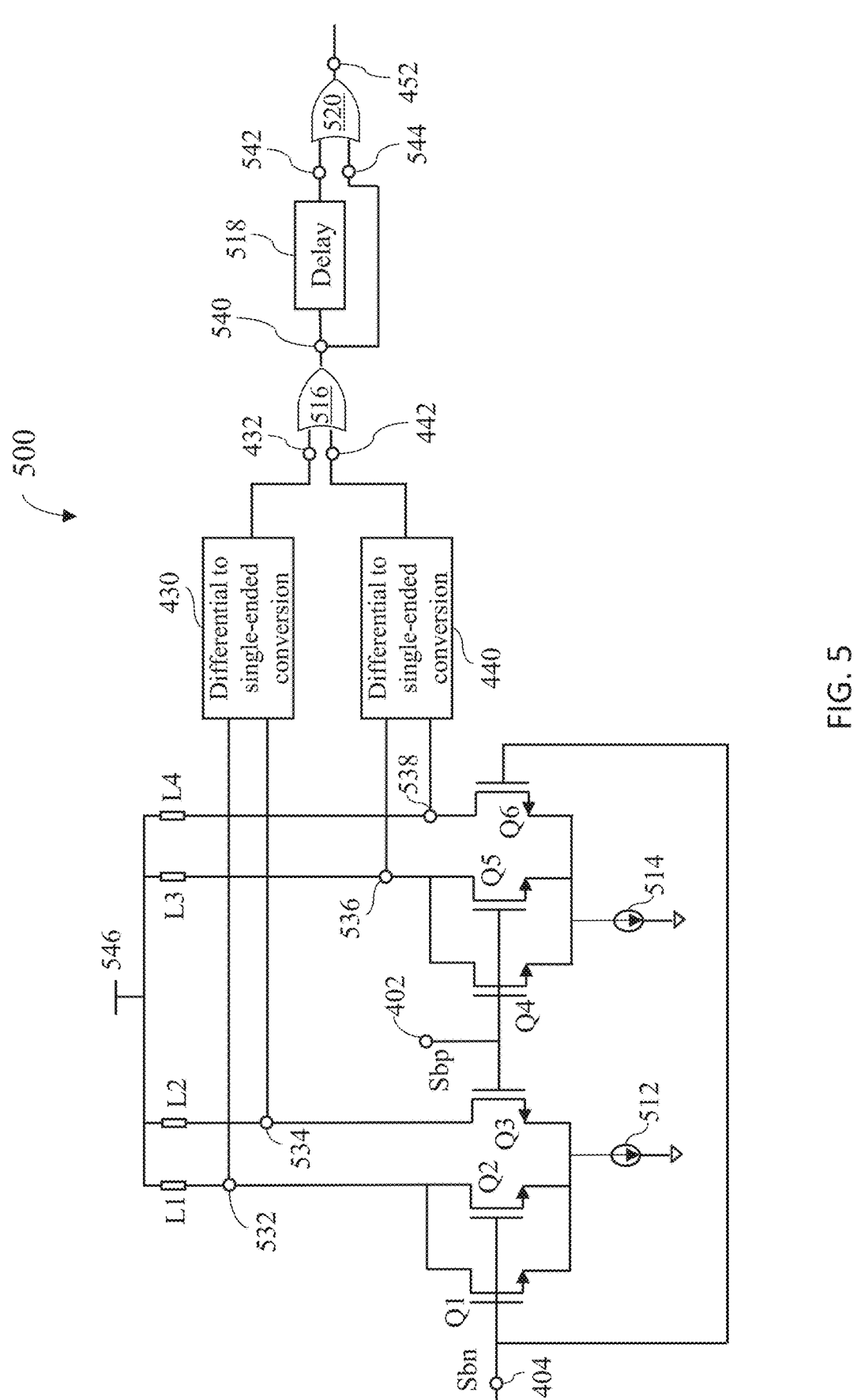
FIG. 5 is a diagram of an example circuit for implementing the clock recovery block in FIG. 4 according to embodiments of the present disclosure.

FIG. 5 is a diagram of an example circuit 500 for implementing the clock recovery circuit 400 according to embodiments of the present disclosure. The circuit 500 includes switches Q1-Q6, loads L1-L4, current sources 512 and 514, the differential to single-ended conversion circuits 430 and 440 as described with respect to FIG. 4, OR gates 516 and 520, and a delay circuit 518.

The switches Q1-Q6 may be field-effect transistors (FETs), such as metal-oxide-semiconductor field-effect transistors (MOSFETs), and other types of transistors. They may be P-type or N-type. In this example, Q1-Q6 are N-type transistors. The loads L1-L4 may be resistance elements or transistors, such as FETs. The loads L1-L4 are connected respectively to a power supply 546, which is a voltage power supply. Q2, Q3, Q5 and Q6 may be the same transistors. Q1 and Q4 may have smaller sizes than Q2, Q3, Q5 and Q6. That is, Q1 and Q4 have on-resistance smaller than Q2, Q3, Q5 and Q6.

The switches Q1-Q3, the loads L1 and L2, and the current source 512 constitute the amplifier circuit 410 in FIG. 4. Q2 (together with Q1) and Q3 constitute a differential pair of the amplifier circuit 410, which is asymmetric due to addition of Q1. The gates of Q1 and Q2 are connected to the input terminal 404, receiving the negative component Sbn of the input differential signal. Q1 and Q2 are connected in parallel between the load L1 and the current source 512. The drains of Q1 and Q2 are connected to the load L1 at a node 532, and the sources of Q1 and Q2 are connected to the current source 512 which is connected to the ground. The drain of Q3 is connected to the load L2 at a node 534, and the source of Q3 is connected to the current source 512. The gate of Q3 is connected to the input terminal 402 receiving the positive component Sbp of the input differential signal. The current source 512 is a constant current source for supplying a bias current to the differential pair of the amplifier circuit 410.

As the voltage at the gate of Q2 or Q3 increases to be greater than a voltage threshold, Q2 or Q3 is turned on, and as the voltage at the gate of Q2 or Q3 decreases to be less than the voltage threshold, Q2 or Q3 is turned off. Since the gates of Q2 and Q3 are respectively connected to the Sbn and Sbp, Q2 and Q3 are alternately turned on. Similarly, Q1 is turned on when the voltage at its gate is greater than the voltage threshold and turned off when the voltage is less than the voltage threshold. Q1 has a smaller on-resistance than Q2 and Q3.

The switches Q4-Q6, the loads L3 and L4, and the current source 514 constitute the amplifier circuit 420 in FIG. 4. The current source 514 may be the same as the current source 512. Q5 (together with Q4) and Q6 constitute a differential pair of the amplifier circuit 420, which is asymmetric due to addition of Q4. The gates of Q4 and Q5 are connected to the input terminal 402, receiving the positive component Sbp of the input differential signal. Q4 and Q5 are connected in parallel between the load L3 and the current source 514. The drains of Q4 and Q5 are connected to the load L3 at a node 536, and the sources of Q4 and Q5 are connected to the current source 514 which is connected to the ground. The drain of Q6 is connected to the load LA at a node 538, and the source of Q6 is connected to the current source 514. The gate of Q6 is connected to the input terminal 404 receiving the negative component Sbn of the input differential signal. The current source 514 is a constant current source for supplying a bias current to the differential pair of the amplifier circuit 420.

As the voltage at the gate of Q5 or Q6 increases to be greater than a voltage threshold, Q5 or Q6 is turned on, and as the voltage at the gate of Q5 or Q6 decreases to be less than the voltage threshold, Q5 or Q6 is turned off. Since the gates of Q5 and Q6 are respectively connected to the Sbp and Sbn, Q5 and Q6 are alternately turned on and off. Similarly, Q4 is turned on and off when the voltage at its gate becomes greater than the voltage threshold and less than the voltage threshold.

The nodes 532 and 534 are connected to input terminals of the differential to single-ended conversion circuit 430. The first differential signal pair are generated at the nodes 532 and 534 and fed to the differential to single-ended conversion circuit 430, which generates and outputs the first single-ended signal at its output terminal 432.

The nodes 536 and 538 are connected to input terminals of the differential to single-ended conversion circuit 440. The second differential signal pair are generated at the nodes 536 and 538 and fed to the differential to single-ended conversion circuit 440, which generates and outputs the second single-ended signal at its output terminal 432.

The OR gates 516 and 520, and the delay circuit 518 may constitute the filter 450. The OR operation is performed on the first single-ended signal and the second single-ended signal at the OR gate 516, which outputs a first filtered signal at its output terminal 540. The first filtered signal is delayed by the delay circuit 518 for a delay time Δt, and the delay circuit 518 outputs a delayed signal to a first input terminal 542 of the OR gate 520. The delay time Δt may be configured/set and adjusted according to the signals output at nodes/terminals of the previous stages in order to generate a pulse signal at the output terminal 452 corresponding to the input burst signal. Delay circuits are well known in the art. Any time delay circuit existing or developed in future that can achieve the purpose of delaying the first filtered signal for a delay time Δt may be used to implement the delay circuit 518. The first filtered signal is also fed to a second input terminal 544 of the OR gate 520. The OR operation is performed on the delayed signal at the terminal 542 and the first filtered signal at the terminal 544 by the OR gate 520, which generates a pulse signal at the output terminal 452.

The amplifier circuits 410, 420 and the filter 450 may further include other applicable circuits/components in addition to what is described above, or may have configurations different from what is described above. As an example, the circuit 500 may include a second delay circuit connected to the terminal 452 and a third OR gate. The pulse signal at the output terminal 452 may be further delayed by the second delay circuit to generate a second delay signal. The third OR gate may perform the OR operation on the second delay signal and the pulse signal at the output terminal 452 to generate another pulse signal, which is further smoothed out. In some embodiment, the delay circuit 518 and the OR gate 520 may form a pulse filter. The circuit may include multiple pulse filter connected in cascade in order to generate a low-noise pulse signal corresponding to a burst signal for clock recovery. The differential to single-ended conversion circuits 430 and 440 may be implemented in various ways as conventionally known and adopted, and details are not described herein.

Figure 6:
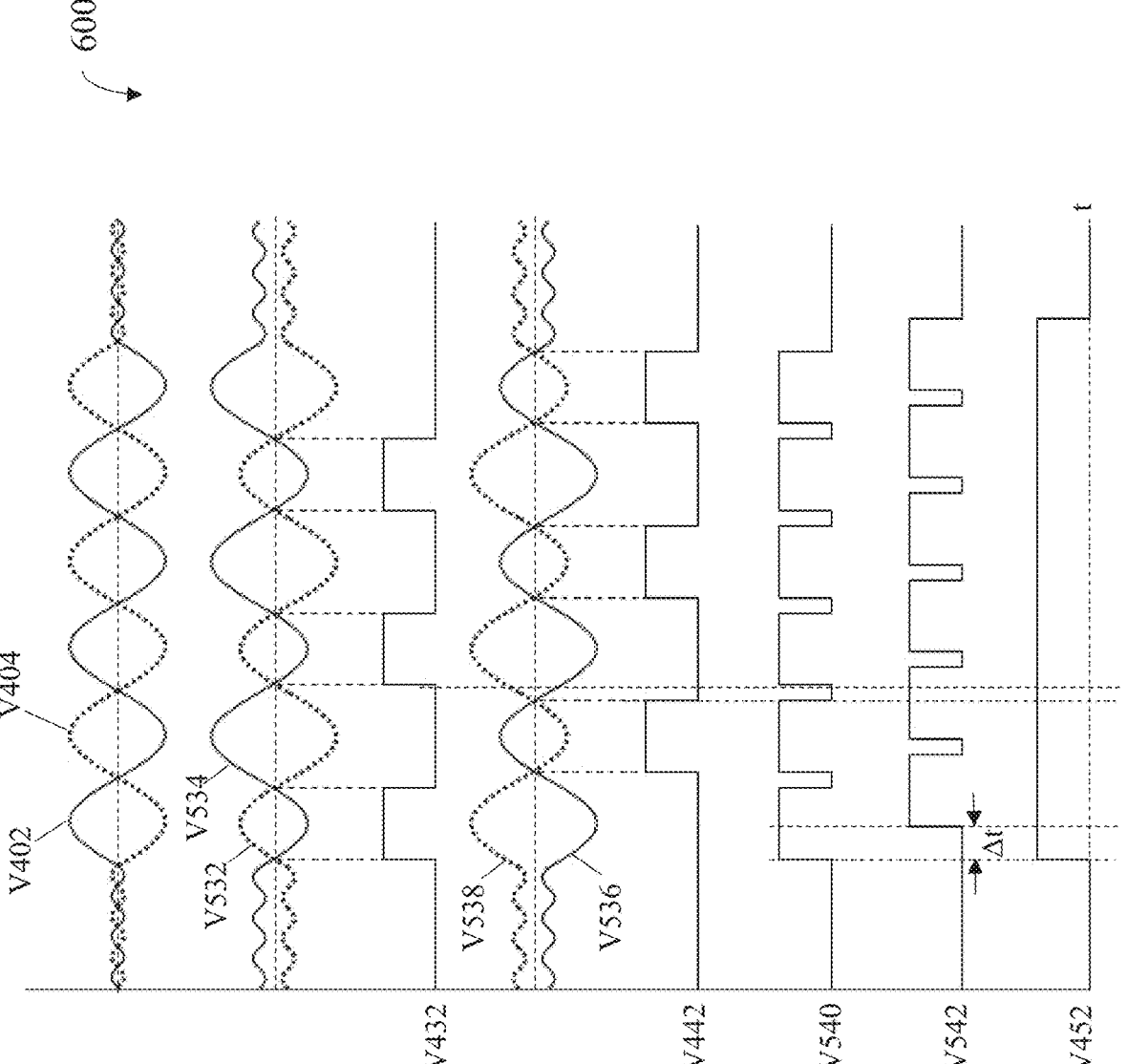
FIG. 6 is a diagram showing example waveforms of the circuit in FIG. 5.

FIG. 6 is a diagram 600 showing example waveforms of the circuit 500. FIG. 6 shows waveforms at the terminals 402, 404, 432, 442, 540, 542 and 452, and the nodes 532-538. In this example, the burst signal input into the circuit 500 in a clock cycle is a voltage differential signal including the positive component Sbp and the negative component Sbn.

Figure 7:
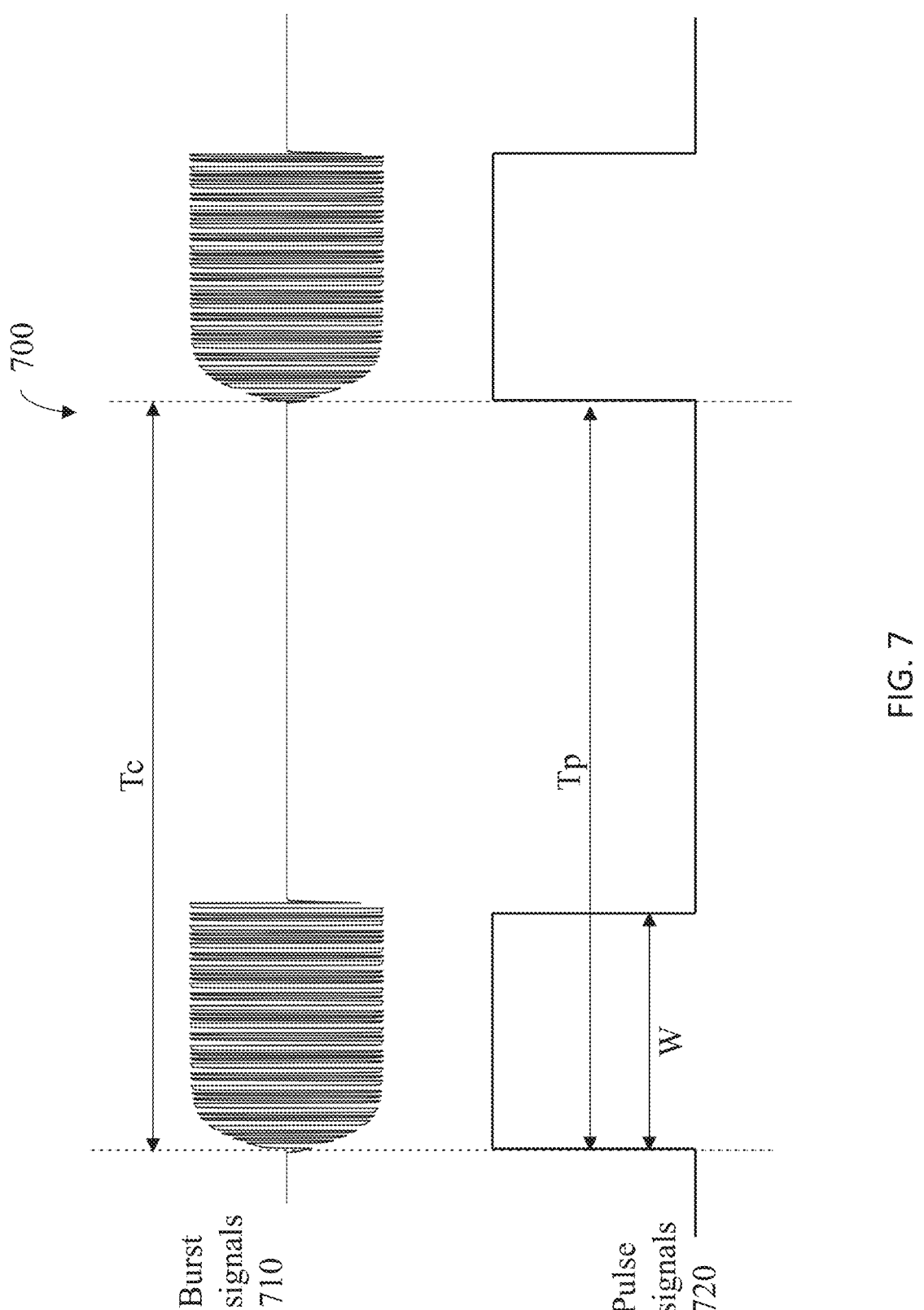
FIG. 7 is a diagram showing an example of input burst signals and pulse signals generated based on the input burst signals utilizing the circuit in FIG. 5.

FIG. 7 is a diagram 700 showing input burst signals 710 and pulse signals 720 generated based on the input burst signals 710 utilizing the clock recovery circuit 500. The period Tp of the pulse signals (i.e., the time interval between rising edges of the two adjacent pulses) is the period Tc of the clock signal of the burst signals 710. Each pulse in a clock cycle has a width W corresponding to the width of the burst signal of the clock cycle. The pulse signals 720 may be used as the clock signal of the burst signals 710. A lane may continuously generate pulse signals of the incoming burst signals and send the pulse signals to the CMU, which utilizes the pulse signals to generate the data frequency for the PCS to recover the data of the burst signals.

FIG. 8 is a flowchart of an example method 800 for clock recovery of burst signals according to embodiments of the present disclosure. The method 800 may be performed at lane(s) of a burst mode communication system, such as lanes 232 and 234 of the system 200, and may be performed using a clock recovery circuit/block, such as clock recovery block 400 or the circuit 500. As shown, at step 810, the clock recovery circuit receives a first burst data stream in a first clock cycle of a clock signal and a second burst data stream in a second clock cycle of the clock signal, where the second clock cycle is adjacent to the first clock cycle. The first data stream and the second data stream are sent according to the clock signal having a clock frequency.

At step 820, the clock recovery circuit converts the first burst data stream into a first pulse signal and converts the second burst data stream into a second pulse signal. At step 830, the clock recovery circuit recovers the clock signal by detecting a time difference between rising edges of the first pulse signal and the second pulse signal. Conversion of the burst data streams into pulses may be implemented as described above, e.g., using the circuit 500. The method 800 may further include determining the clock frequency based on the time interval detected. In some embodiments, the method 800 may include sending the recovered clock signal to a clock multiplier unit, which generates a data frequency of the burst data streams based on the clock frequency of the clock signal.

The method 800 may be implemented using other circuits different from the embodiment circuits 400 or 500 without departing from spirit and principle of the present disclosure. Embodiments of the present disclosure for clock recovery as described above may be implemented using hardware, firmware, software, or any combination thereof.

As an example, embodiments of the present disclosure may be performed as computer-implemented methods. The methods may be implemented in a form of software. In one embodiment, the software may be obtained and loaded into a computer, processor or any other machines that can run the software. Embodiments of the disclosure may further be implemented as instructions stored on a computer-readable storage device or media, which may be read and executed by at least one processor to perform the methods described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, solid state storage media, and other storage devices and media. As an example, an lane apparatus of a burst mode communication system may include one or more processors and a non-transitory memory storing computer readable instructions. The one or more processors may be configured to execute the instructions to perform clock recovery as described in the embodiments of the present disclosure.

Figure 9:
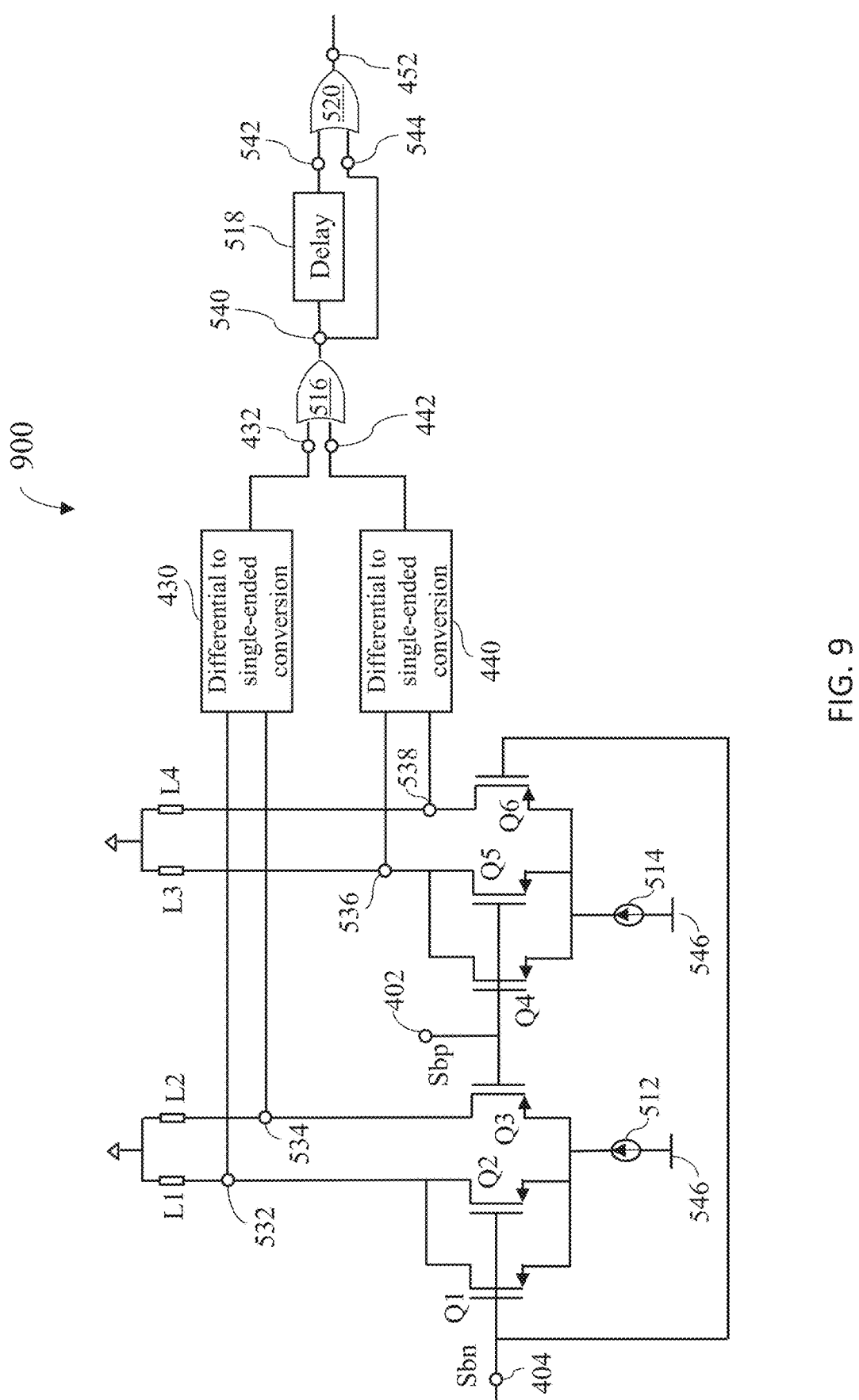
FIG. 9 is a diagram of another example circuit for implementing the clock recovery block in FIG. 4 according to embodiments of the present disclosure.

FIG. 9 is a diagram of another example circuit 900 for implementing the clock recovery circuit 400 according to embodiments of the present disclosure. The difference between the circuit 900 and the circuit 500 is that the switches Q1-Q6 in the circuit 900 are P-type transistors. In this example, a first terminal of the current source 512 is coupled to the sources of Q1-Q3, and a second terminal of the current source 512 is coupled to the power supply 546. A first terminal of the current source 514 is coupled to the sources of Q4-Q6, and a second terminal of the current source 514 is coupled to the power supply 546. The load L1 is coupled to Q1 and Q2 at the node 532, and is coupled between the node 532 and the ground. The load L2 is coupled to Q3 at the node 534, and is coupled between the node 534 and the ground. The load L3 is coupled to Q4 and Q5 at the node 536, and is coupled between the node 536 and the ground. The load L4 is coupled to Q6 at the node 538, and is coupled between the node 538 and the ground. The other components of the circuit 900 are similar to the corresponding components of the circuit 500. Operation of the circuit 900 are similar to that of the circuit 500 and is not repeated herein.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, which may perform substantially the same function or achieve substantially the same result as the corresponding embodiments described herein, may be utilized according to the present disclosure. Accordingly, the appended claims are intended to include within their scope such processes, machines, manufacture, compositions of matter, means, methods, or steps.

What is claimed:

1. A lane of a burst mode communication system, comprising:

a transceiver configured to receive burst data streams sent according to a clock signal having a clock frequency; and a clock recovery circuit in communication with the transceiver and configured to:

receive, from the transceiver, a first burst data stream in a first clock cycle of the clock signal and a second burst data stream in a second clock cycle of the clock signal, the second clock cycle being adjacent to the first clock cycle;

convert the first burst data stream into a first pulse signal and convert the second burst data stream into a second pulse signal; and recover the clock signal based on a time interval between rising edges of the first pulse signal and the second pulse signal;

wherein each of the burst data streams is a differential signal, which comprises a first signal being a positive component of the differential signal and a second signal being a negative component of the differential signal.

2. The lane of claim 1, wherein recovering the clock signal comprises determining the clock frequency based on the time interval.

3. The lane of claim 1, wherein the clock recovery circuit comprises:

a first amplifier circuit having a first positive input terminal and a first negative input terminal, wherein the first amplifier circuit is configured to: receive the first signal of a burst data stream of the burst data streams at the first positive input terminal, receive the second signal of the burst data stream at the first negative input terminal, and generate a first differential signal of the burst data stream;

a second amplifier circuit having a second positive input terminal and a second negative input terminal, wherein the second amplifier circuit is configured to: receive the first signal of the burst data stream at the second negative input terminal, receive the second signal of the burst data stream at the second positive input terminal, and generate a second differential signal of the burst data stream;

a first differential to single-ended conversion circuit connected to the first amplifier circuit, and configured to convert the first differential signal of the burst data stream into a first single-ended signal;

a second differential to single-ended conversion circuit connected to the second amplifier circuit, and configured to convert the second differential signal of the burst data stream into a second single-ended signal; and a filter circuit connected to the first differential to single-ended conversion circuit and the second differential to single-ended conversion circuit, wherein the filter circuit is configured to process the first single-ended signal and the second single-ended signal to generate a pulse signal of the burst data stream.

4. The lane of claim 3, wherein:

the first amplifier circuit comprises:

a first switch and a second switch connected in parallel between a first node and a first current source, wherein drains of the first switch and the second switch are connected to the first node, sources of the first switch and the second switch are connected to the first current source, and gates of the first switch and the second switch are connected to the second signal of the burst data stream; and a third switch having a gate connected to the first signal of the burst data stream, a source connected to the first current source, and a drain connected to a second node, wherein the first node and the second node are connected to the first differential to single-ended conversion circuit; and the second amplifier circuit comprises:

a fourth switch and a fifth switch connected in parallel between a third node and a second current source, wherein drains of the fourth switch and the fifth switch are connected to the third node, sources of the fourth switch and the fifth switch are connected to the second current source, and gates of the fourth switch and the fifth switch are connected to the first signal of the burst data stream; and a sixth switch having a gate connected to the second signal of the burst data stream, a source connected to the second current source, and a drain connected to a fourth node, wherein the third node and the fourth node are connected to the second differential to single-ended conversion circuit.

5. The lane of claim 4, further comprising:

a first load, a second load, a third load and a fourth load coupled to the first node, the second node, the third node and the fourth node, respectively.

6. The lane of claim 5, wherein the first load, the second load, the third load and the fourth load are coupled between ground and the first node, the second node, the third node and the fourth node, respectively.

7. The lane of claim 5, wherein the first load, the second load, the third load and the fourth load are coupled between a power supply and the first node, the second node, the third node and the fourth node, respectively.

8. The lane of claim 4, wherein the first switch and the fourth switch have an on-resistance less than the second switch, the third switch, the fifth switch and the sixth switch.

9. The lane of claim 4, wherein the first to sixth switches are field-effect transistors (FETs).

10. The lane of claim 3, wherein the filter circuit comprises:

a first OR gate having a first input terminal connected to the first differential to single-ended conversion circuit, and a second input terminal connected to the second differential to single-ended conversion circuit, wherein the first OR gate is configured to perform an OR operation on the first single-ended signal and the second single-ended signal to generate a first filtered signal of the burst data stream at an output terminal of the first OR gate;

a delay circuit connected to the output terminal of the first OR gate, wherein the delay circuit is configured to delay the first filtered signal to generate a delayed signal; and a second OR gate configured to receive the delayed signal and the first filtered signal and generate the pulse signal of the burst data stream.

11. A burst mode communication system comprising at least one lane, the at least one lane comprising;

a transceiver configured to receive burst data streams sent to the burst mode communication system according to a clock signal having a clock frequency; and a clock recovery circuit in communication with the transceiver and configured to:

receive, from the transceiver, a first burst data stream in a first clock cycle of the clock signal and a second burst data stream in a second clock cycle of the clock signal, the second clock cycle being adjacent to the first clock cycle;

convert the first burst data stream into a first pulse signal and convert the second burst data stream into a second pulse signal; and recover the clock signal by detecting a time difference between rising edges of the first pulse signal and the second pulse signal;

wherein each of the burst data streams is a differential signal, which comprises a first signal being a positive component of the differential signal and a second signal being a negative component of the differential signal.

12. The burst mode communication system of claim 11, wherein recovering the clock signal comprises determining the clock frequency based on the time difference detected.

13. The burst mode communication system of claim 12, wherein the clock recovery circuit comprises:

a first amplifier circuit having a first positive input terminal and a first negative input terminal, wherein the first amplifier circuit is configured to: receive the first signal of a burst data stream of the burst data streams at the first positive input terminal, receive the second signal of the burst data stream at the first negative input terminal, and generate a first differential signal of the burst data stream;

a second amplifier circuit having a second positive input terminal and a second negative input terminal, wherein the second amplifier circuit is configured to: receive the first signal of the burst data stream at the second negative input terminal, receive the second signal of the burst data stream at the second positive input terminal, and generate a second differential signal of the burst data stream;

a first differential to single-ended conversion circuit coupled to the first amplifier circuit, and configured to convert the first differential signal of the burst data stream into a first single-ended signal;

a second differential to single-ended conversion circuit coupled to the second amplifier circuit, and configured to convert the second differential signal of the burst data stream into a second single-ended signal; and a filter circuit connected to the first differential to single-ended conversion circuit and the second differential to single-ended conversion circuit, wherein the filter circuit is configured to process the first single-ended signal and the second single-ended signal to generate a pulse signal of the burst data stream.

14. The burst mode communication system of claim 13, wherein:

the first amplifier circuit comprises:

a first switch and a second switch connected in parallel between a first node and a first current source, wherein drains of the first switch and the second switch are connected to the first node, sources of the first switch and the second switch are connected to the first current source, and gates of the first switch and the second switch are connected to the second signal of the burst data stream; and a third switch having a gate connected to the first signal of the burst data stream, a source connected to the first current source, and a drain connected to a second node, wherein the first node and the second node are connected to the first differential to single-ended conversion circuit; and the second amplifier circuit comprises:

a fourth switch and a fifth switch connected in parallel between a third node and a second current source, wherein drains of the fourth switch and the fifth switch are connected to the third node, sources of the fourth switch and the fifth switch are connected to the second current source, and gates of the fourth switch and the fifth switch are connected to the first signal of the burst data stream; and a sixth switch having a gate connected to the second signal of the burst data stream, a source connected to the second current source, and a drain connected to a fourth node, wherein the third node and the fourth node are connected to the second differential to single-ended conversion circuit.

15. The burst mode communication system of claim 14, wherein the clock recovery circuit further comprises:

a first load, a second load, a third load and a fourth load coupled to the first node, the second node, the third node and the fourth node, respectively.

16. The burst mode communication system of claim 14, wherein the first switch and the fourth switch have an on-resistance less than the second switch, the third switch, the fifth switch and the sixth switch.

17. The burst mode communication system of claim 14, wherein the first to sixth switches are field-effect transistors (FETs).

18. The burst mode communication system of claim 13, wherein the filter circuit comprises:

a first OR gate having a first input terminal connected to the first differential to single-ended conversion circuit, and a second input terminal connected to the second differential to single-ended conversion circuit, wherein the first OR gate is configured to perform an OR operation on the first single-ended signal and the second single-ended signal to generate a first filtered signal of the burst data stream at an output terminal of the first OR gate;

a delay circuit connected to the output terminal of the first OR gate, wherein the delay circuit is configured to delay the first filtered signal to generate a delayed signal; and a second OR gate configured to receive the delayed signal and the first filtered signal and generate the pulse signal of the burst data stream.

19. The burst mode communication system of claim 11, further comprising:

clock multiplier in communication with the at least one lane, and configured to:

receive the recovered clock signal; and generate a data frequency of the burst data streams based on the recovered clock signal.

20. The burst mode communication system of claim 19, further comprising:

a physical coding sublayer in communication with the clock multiplier, the physical coding sublayer being configured to receive the data frequency from the clock multiplier and process one or more of the burst data streams based on the data frequency.

* * * * *